(12) United States Patent
Chen

(10) Patent No.: US 8,207,714 B2
(45) Date of Patent: *Jun. 26, 2012

(54) METHOD AND APPARATUS FOR EXTERNAL CONTROL MODE STEP DOWN SWITCHING REGULATOR

(75) Inventor: Wei Chen, Saratoga, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/718,852

(22) Filed: Mar. 5, 2010

(65) Prior Publication Data

US 2010/0213910 A1    Aug. 26, 2010

Related U.S. Application Data

(63) Continuation of application No. 11/955,273, filed on Dec. 12, 2007, now Pat. No. 7,679,341.

(51) Int. Cl.
*G05F 1/613* (2006.01)
(52) U.S. Cl. ......... 323/224; 323/283; 323/288; 327/589
(58) Field of Classification Search .................. 323/224, 323/283, 284, 288; 327/589
See application file for complete search history.

(56) References Cited

U.S. PATENT DOCUMENTS

| | | | |
|---|---|---|---|
| 5,414,341 A * | 5/1995 | Brown ........................... | 323/268 |
| 6,774,611 B2 | 8/2004 | Umminger et al. | |
| 6,801,024 B2 | 10/2004 | Bernardon | |
| 7,045,992 B1 * | 5/2006 | Silva et al. .................... | 323/222 |
| 7,061,213 B2 | 6/2006 | Yoshida et al. | |
| 7,072,198 B2 | 7/2006 | Krug et al. | |
| 7,298,124 B2 | 11/2007 | Kan et al. | |
| 7,504,812 B2 | 3/2009 | Riehl | |
| 7,514,908 B2 | 4/2009 | Hosokawa et al. | |
| 7,777,468 B2 * | 8/2010 | Okuda et al. .................. | 323/282 |
| 7,859,233 B1 * | 12/2010 | Silva et al. .................... | 323/222 |
| 7,880,458 B2 * | 2/2011 | Cannella et al. .............. | 323/288 |

\* cited by examiner

*Primary Examiner* — Shawn Riley
(74) *Attorney, Agent, or Firm* — Perkins Coie LLP

(57) ABSTRACT

A switching regulator integrated circuit (IC) is disclosed that includes a switch circuit that further includes a first switch and a second switch, a mode selector circuit controlled by external circuitry to select between a first mode and a second mode, and a control circuit. In response to a feedback signal from the switch circuit, when the first mode is selected, the control circuit toggles the first switch and the second switch ON and OFF alternately at a fixed first frequency. When a second mode is selected, the control circuit causes the second switch to turn OFF completely and the first switch to switch ON and OFF at a variable second frequency.

3 Claims, 6 Drawing Sheets

METHOD AND APPARATUS FOR EXTERNAL CONTROL MODE STEP DOWN SWITCHING REGULATOR

CROSS-REFERENCE TO RELATED APPLICATIONS

This application is a continuation of U.S. patent application Ser. No. 11/955,273, filed Dec. 12, 2007 now U.S. Pat. No. 7,679,341 and titled METHOD AND APPARATUS FOR EXTERNAL CONTROL MODE STEP DOWN SWITCHING REGULATOR, which is incorporated herein by reference in its entirety.

FIELD OF INVENTION

The present invention relates generally to the field of analog integrated circuits. More specifically, the present invention relates to switch mode voltage regulators.

BACKGROUND ART

The increase in demand for maximum battery run-time and performance in portable devices translates directly into the increase in demand for high efficiency and low noise switch-mode voltage regulator circuits. Typically, the power supply system in a portable device includes a single battery source connected to a switch mode voltage regulator circuit and to a load. Since battery capacity is limited in portable electronic devices, a switch-mode voltage regulator circuit must have power efficiency to extend battery run-time. There are many attempts in prior arts to improve power efficiency in switch mode voltage regulator circuits to extend battery run-time.

Referring now to FIG. 1, a prior art switch mode voltage regulator circuit 100 is shown. In prior art switch mode voltage regulator circuit 100, power efficiency is improved by employing a sleep mode method. That is, switch mode regulator circuit 100 generates a control signal to turn one or both MOSFET switching transistors 141 and 142 off under operating conditions when the voltage at the output terminal ($V_{OUT}$) is capable of being maintained substantially at the regulated voltage level by the charge in the output capacitor ($C_{OUT}$) 152. Even though the sleep mode method may achieve a relatively high power efficiency, high ripple voltages caused by the turning on and off the MOSFET switching transistors 141 and 142 often degrade the performance of switch mode voltage regulator circuit 100. Furthermore, turning on and off the MOSFET switching transistors 141 and 142 randomly, based on the load current ($I_L$), causes uneven on-time pulses that produce spurious signals, thus worsening the noise performance of prior art switch mode voltage regulator circuit 100. In other words, such sleep mode method presents severe output voltage variations over a wide operation range. Especially, in today's portable devices, the microprocessors, as the loads for switch mode voltage regulator circuit 100, often transition from sleep mode to full operation in a matter of nanoseconds, thus presenting a steep load step and uneven pulse that increases the ripple voltage and undermines the noise performance at the output of switch mode voltage regulator circuit 100.

In addition, there are multiple ways to regulate power efficiently in a switch mode voltage regulator circuit. The first way is to provide a constant on-time to the high-side switch which decreases output ripple voltage and noise. The second way is to improve switching efficiency. Other ways to regulate power include synchronous rectification, zero-voltage switching (ZVS), mode-hopping, and variable frequency operation. Depending on the operating conditions, mode selection by a user-controlled pin should be allowed to achieve best efficiency performance. Prior art switching regulator circuit 100 only allows one way to regulate power simply by monitoring the load current and issuing a control signal to turn off both MOSFET switching transistors 141 and 142 to save energy. Whereas other methods of power saving techniques cannot be selected by the user.

BRIEF DESCRIPTION OF THE DRAWINGS

The accompanying drawings, which are incorporated in and from a part of this specification, illustrate embodiments of the invention and, together with the description serve to explain the principles of the invention.

DETAILED DESCRIPTION OF THE INVENTION

Figure 1:
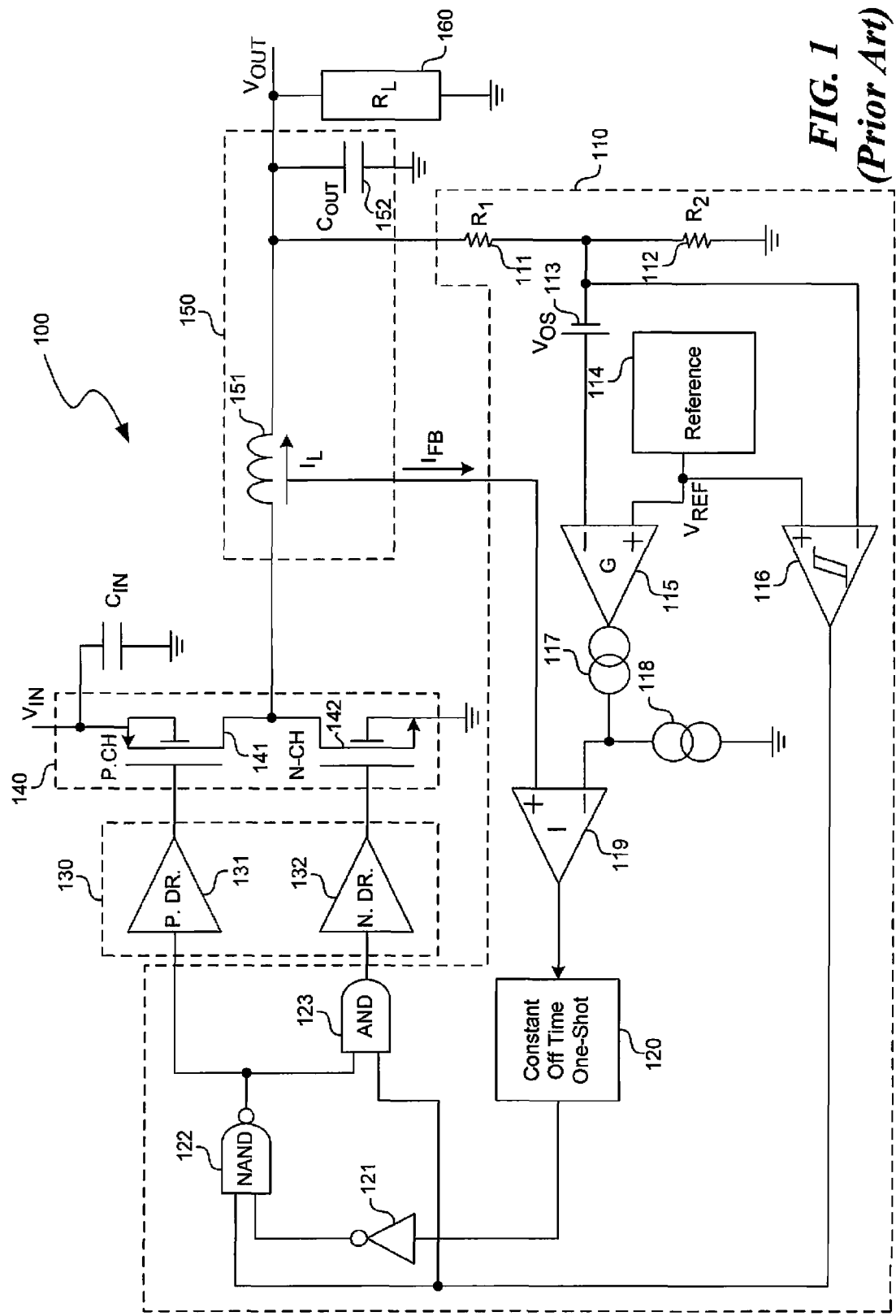
FIG. 1 illustrates a schematic diagram of a prior art switch mode step down regulator circuit that produces high ripple voltages during sleep mode.
Figure 2:
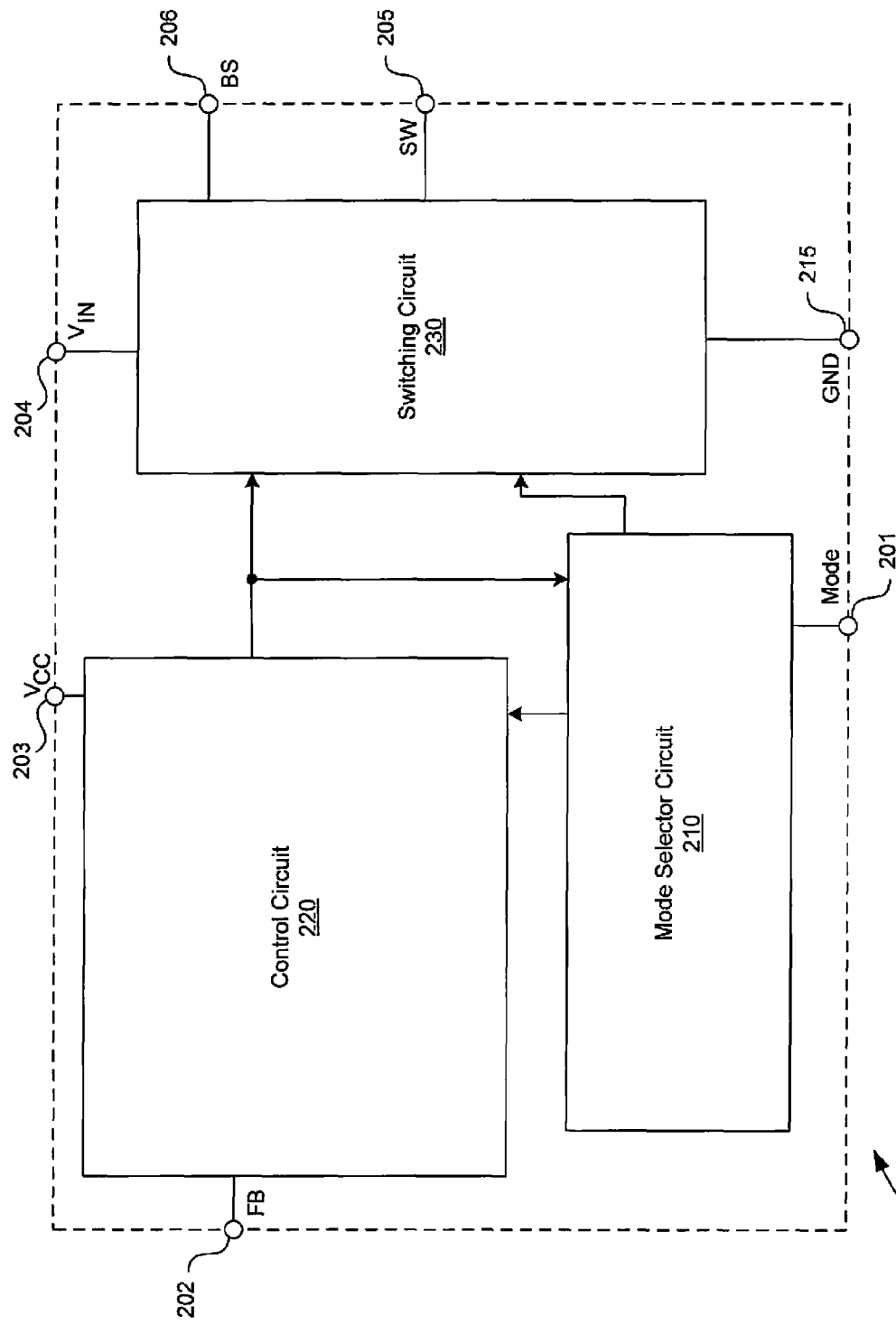
FIG. 2 illustrates a block diagram of a switch mode voltage regulator circuit that includes user mode selection in accordance with an embodiment of the present invention.

Now referring to FIG. 2, a block diagram of a switch mode voltage regulator integrated circuit 200 in accordance with an embodiment of the present invention is shown. In one embodiment, switch-mode voltage regulator integrated circuit 200 includes a mode selector electrical pin (MODE) 201, a feedback electrical pin (FB) 202, a power supply electrical pin ($V_{CC}$) 203, an input voltage electrical pin ($V_{IN}$) 204, switch node electrical pin (SW) 205, a boot strap electrical pin (BS) 206, an electrical ground pin (GND) 215. In one embodiment, switch-mode voltage regulator integrated circuit 200 may include a reference voltage ($V_{REF}$) electrical pin (not shown) so that the reference voltage ($V_{REF}$) may be adjustable by the user or external circuitry.

Structurally, switch mode voltage regulator integrated circuit 200 includes a mode selector circuit 210, a control circuit 220, and a switch circuit 230. As shown in FIG. 2, mode selector circuit 210 is electrically connected to mode selector electrical pin (MODE) 201 for receiving a mode control instruction from an external circuitry (not shown). In one embodiment, mode selector circuit 210 receives either a synchronous mode instruction (MODE set to 1) or an asynchronous mode instruction (MODE set to 0) at mode selector electrical pin (MODE) 201. Control circuit 220 is electrically connected to feedback electrical pin (FB) 202, a power supply ($V_{CC}$) electrical pin 203, and a boot strap electrical pin (BS) 206. Feedback electrical pin (FB) 202 receives a sample of an output voltage ($V_{OUT}$) so that control circuit 220 can regulate the output voltage ($V_{OUT}$). Power supply electrical pin ($V_{CC}$) 203 receives a supply voltage ($V_{CC}$) and distributes to mode selector circuit 210 and switch circuit 230. Boot strap electrical pin (BS) 206 connects control circuit 220 to switch node electrical pin (SW) 205 via a boot capacitor (not shown). Similarly, switch circuit 230 is electrically connected to an electrical ground pin (GND) 215, an input signal electrical pin ($V_{IN}$) 204, and a switch mode electrical pin (SW) 205. Electrical ground pin (GND) 215 receives an electrical ground voltage and distributes it to mode selector circuit 210 and to switch circuit 230. Input voltage electrical pin ($V_{IN}$) 204 receives an unregulated input voltage ($V_{IN}$) from a single battery source such as a lithium ion battery (not shown). Switch node electrical pin (SW) 205 generates a switched voltage signal.

Figure 3:
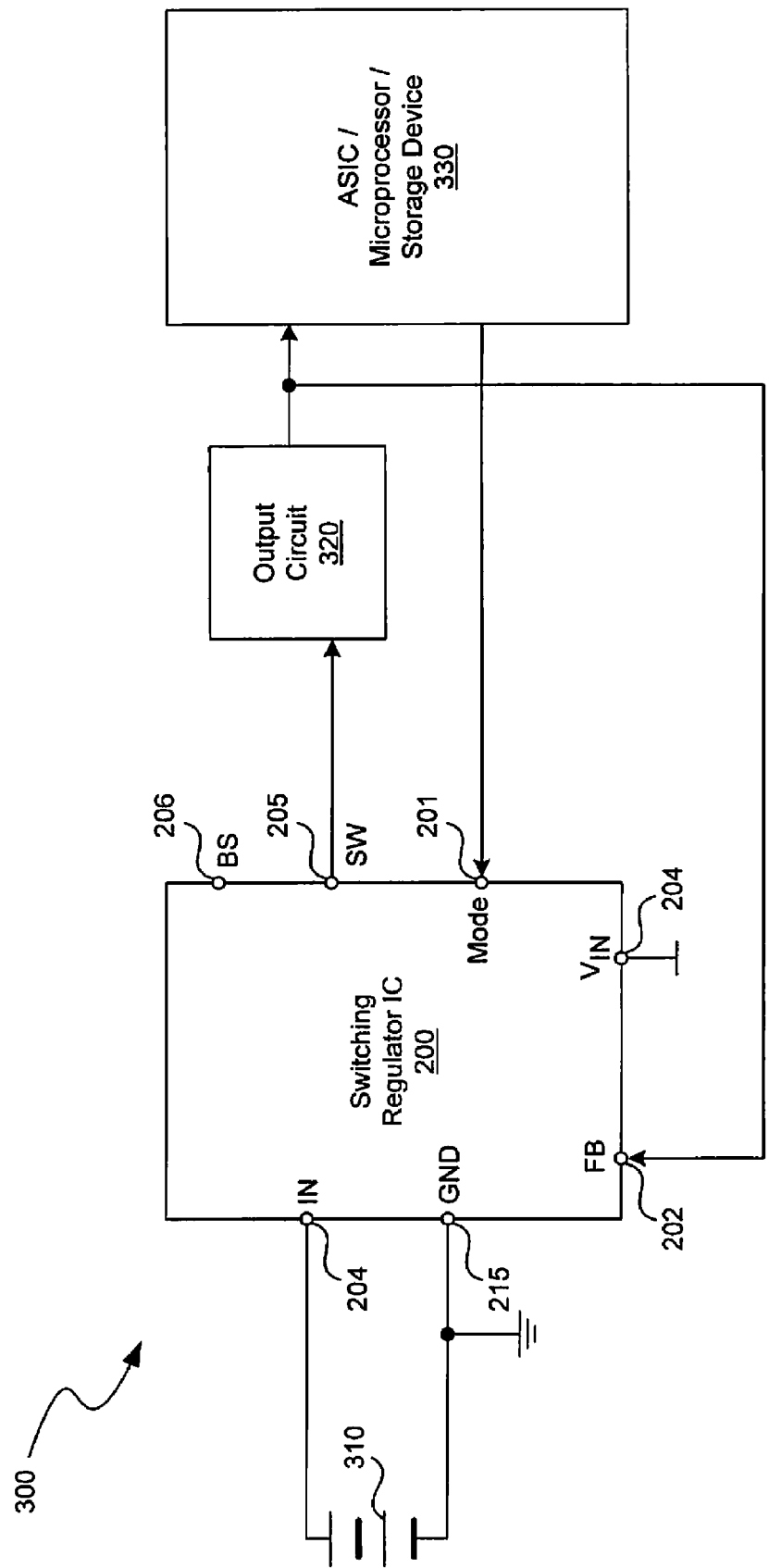
FIG. 3 illustrates a block diagram of a power supply system that includes the switch regulator integrated circuit (IC) of FIG. 2 in connections with the single battery source, and the external circuitry load such as a microprocessor, ASIC, or storage device in accordance with an embodiment of the present invention.

Now referring to FIG. 3, a power supply system 300 for a portable device that uses switch mode voltage regulator integrated circuit 200 of FIG. 2 is shown. Power supply system 300 includes switch mode voltage regulator integrated circuit 200, an output circuit 320, a single battery source 310, and external circuitry 330 in accordance with an embodiment of the present invention. In one embodiment of the present invention, external circuitry 330 includes a microprocessor. In one embodiment, external circuitry 330 includes an Application Specific Integrated Circuit (ASIC). And yet in one embodiment, external circuitry 330 includes a storage device. External circuitry 330 knows when light load condition or heavy load condition exists, providing a mode control signal accordingly. More particularly, external circuitry 330 provides a mode control signal to mode selector electrical pin (MODE) 201 of switch mode voltage regulator integrated circuit 200. The mode control signal can be HIGH for synchronous mode of operation during heavy load condition. In contrast, the mode control signal is LOW or 0 for asynchronous mode of operation during light load condition. Single battery source 301 is connected to input voltage electrical pin ($V_{IN}$) 204 and electrical ground pin (GND) 215 of switch mode voltage regulator integrated circuit 200. In one embodiment of the present invention, single battery source 310 can include a Lithium ion battery typically used in laptop computers or in any other portable devices. Switch node electrical pin (SW) 205 is fed to output circuit 320 that provides a regulated DC output voltage ($V_{OUT}$) to external circuitry 330. In return, output voltage ($V_{OUT}$) is sampled and fed back to feedback electrical pin (FB) 202 to monitor the level of output voltage ($V_{OUT}$).

Continuing with FIG. 3, in operation, mode selector circuit 210 receives a mode control signal from external circuitry 330 and transfers this information to control circuit 220. In response, control circuit 220 causes switch circuit 230 to operate in either synchronous mode or asynchronous mode. More particularly, whenever the synchronous mode is selected by external circuitry 330, control circuit 230 is operable to toggle switch circuit 230 on and off alternately at a constant first frequency ($f_0$) so as to produce a desired DC output voltage at output circuit 320. Whenever an asynchronous mode is selected, control circuit 220 is operable to turn off the low side power switch for the entire time period that the asynchronous mode is selected. Then, the high-side power switch and a Schottky diode enter the fixed on-time operation. The operation of asynchronous mode continues until the variable second frequency ($f_{PWM}$) exceeds the first frequency ($f_0$) or the user selects the synchronous mode operation.

Figure 4:
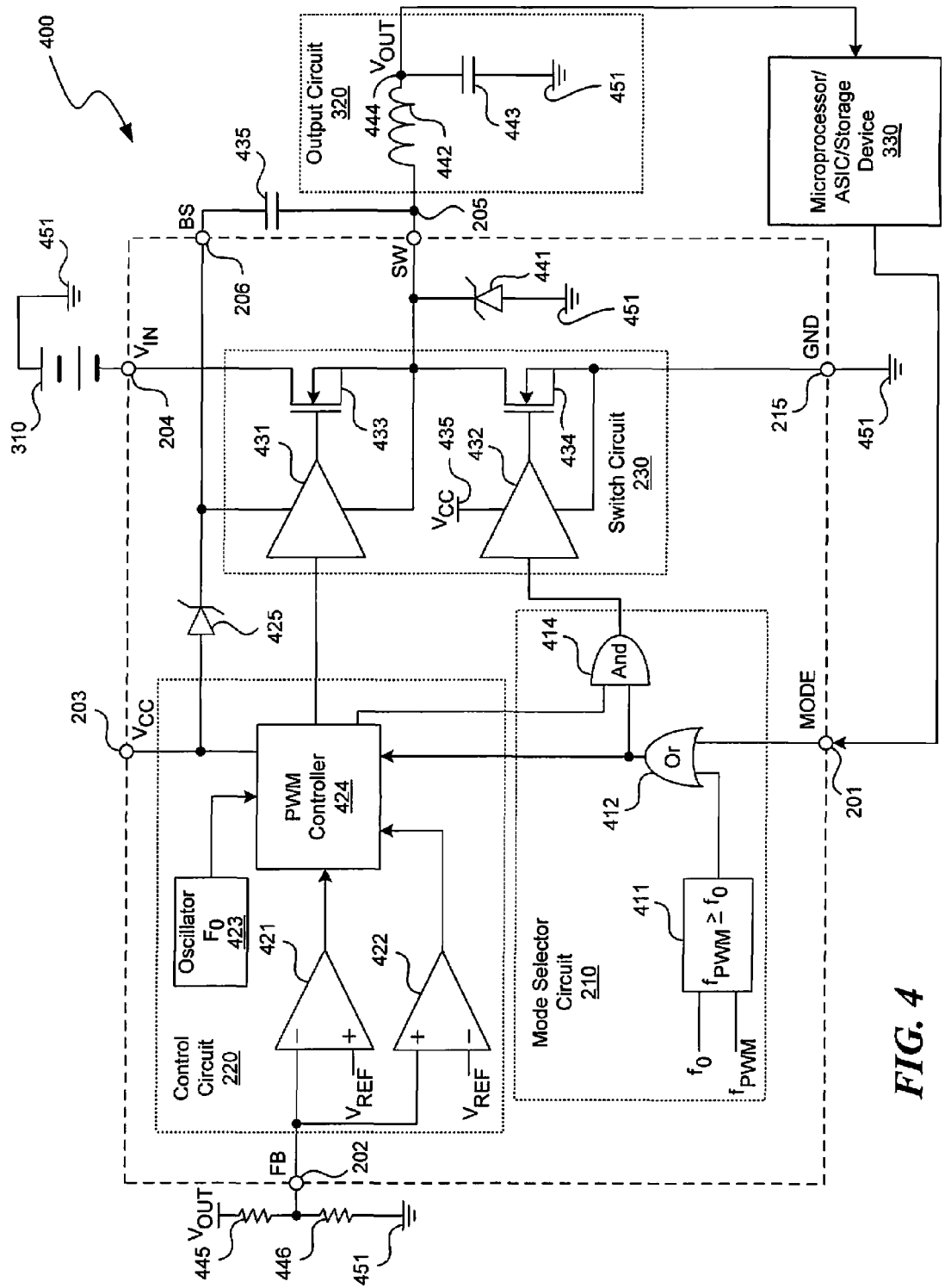
FIG. 4 illustrates detailed schematic diagram of the switch regulator integrated circuit (IC) of FIG. 2 in accordance with an embodiment of the present invention.

Now referring to FIG. 4, a schematic diagram of switch mode voltage regulator integrated circuit (IC) 400 in power supply system 300 is shown. In particularly, control circuit 220 further includes a first error amplifier 421, a second error amplifier 422, an oscillator circuit 423 that generates a signal at constant first frequency ($f_0$), and a pulse width modulation (PWM) controller 424. First error amplifier 421 and second error amplifier 422 each includes an inverting input terminal, a non-inverting input terminal, and an output terminal. The inverting input terminals of both first and second error amplifiers 421 and 422 are electrically coupled to a sample output voltage ($V_{OUT}$) at feedback electrical pin (FB) 202. The non-inverting input terminals are both electrically connected to a reference voltage ($V_{REF}$). The output terminals of first error amplifier 421 and second error amplifier 422 are fed to PWM controller 424.

Continuing with the description of switching regulator integrated circuit (IC) 400, switch circuit 230 includes a high side n-channel Metal Oxide Field Effect Transistor (MOSFET) switch 433 and a low side n-channel MOSFET switch 434. The drain of high side n-channel MOSFET switch 433 is electrically coupled to receive a supply voltage ($V_{CC}$) at power supply electrical pin 203, the gate of high side n-channel MOSFET switch 433 is electrically coupled to receive a logic output signal from a first gate driver circuit 431, the source of high side n-channel MOSFET switch 433 is electrically coupled to the drain of low side n-channel MOSFET switch 434 and to switch node electrical pin (SW) 205. The gate of low side n-channel MOSFET switch 434 is electrically coupled to receive a logic output signal from a second gate driver circuit 432, the source of low side power n-channel MOSFET switch 434 is electrically coupled to an electrical ground 451 at electrical ground pin 215. In one embodiment, first gate driver circuit 431 is a logic circuit that connects to supply voltage (VCC) via a diode 425 and to switch node electrical pin (SW) 205. Similarly, second gate driver circuit 432 is a logic circuit that connects to supply voltage ($V_{CC}$) and to electrical ground 451. In one embodiment, switch mode voltage regulator integrated circuit 400 also includes a boot strap circuit configured by diode 425 and a boot strap capacitor 435. The first terminal of boot strap capacitor 435 electrically coupled to the cathode terminal of diode 425. The second terminal of boot strap capacitor 435 electrically coupled to switch node electrical pin (SW) 205. In one embodiment, switch circuit 230 also includes a Schottky diode 441. The cathode terminal of Schottky diode 441 is electrically connected to the source of high-side n-channel MOS switch 433. The anode terminal of Schottky diode 441 is connected to electrical ground 451.

Continuing with FIG. 4, mode selector circuit 210 further includes a frequency comparator circuit 411, an OR logic gate 412, and an AND logic gate 414. Frequency comparator circuit 411 has a first input terminal, a second input terminal, and an output terminal. The first input terminal is electrically coupled to receive the constant first frequency ($f_0$), the second input terminal is electrically coupled to receive a variable second frequency ($f_{PWM}$). The output terminal is connected to a first input terminal of OR logic gate 412. The second input terminal of OR logic gate 412 is electrically connected to mode selector electrical pin (MODE) 201 for receiving a mode control instruction from external circuitry 330. The output terminal of OR logic gate 412 is connected to a first input terminal of AND logic gate 414. The second input terminal of AND logic gate 414 receives a second gate logic output of PWM controller 424. This second gate logic output is complementary to the first gate logic output that is synchronously fed into first gate driver circuit 431. The output terminal of AND logic gate 414 is connected to drive second gate driver circuit 432. Similarly, the second output of PWM controller 424 is connected to drive first gate driver circuit 431.

Referring again to FIG. 4, in one embodiment of the present invention, switching regulator integrated circuit 400 is electrically connected to an output circuit 320 that includes an inductor 442, and an output capacitor 443. The first terminal of inductor 442 is connected to switch node electrical pin (SW) 205, the second terminal of inductor 442 is electrically connected to output capacitor 443 and to output terminal 444. The output voltage ($V_{OUT}$) at output terminal 444 is feedback to feedback electrical pin (FB) 202 to monitor the output voltage ($V_{OUT}$). The other side of output capacitor 443 is electrically connected to electrical ground 451.

Continuing with FIG. 4, the operation of the above described switch-mode voltage regulator integrated circuit 400 is described as follows. There are two operation modes as commanded by external MODE signal at mode selector electrical pin (MODE) 201: synchronous buck mode and asynchronous buck mode. In synchronous buck mode, mode selector electrical pin (MODE) 201 set to 1, the second input terminal of OR logic gate 412 is set to 1. As a result, PWM controller 424 is enabled and toggles high side n-channel MOSFET switch 433 and low side n-channel MOSFET switch 434 on and off complementarily at a constant first frequency ($f_0$) as a normal synchronous step down converter to produce a desired DC output voltage ($V_{OUT}$). In one embodiment of the present invention, dead times are included by PWM controller 424 to avoid shoot-through problems. Schottky diode 441 conducts the current during the dead time. The synchronous buck operation minimizes the conduction loss compared to the asynchronous buck mode, and the presence of Schottky diode 441 minimizes the conduction loss during the dead time and possibly reduces the body diode reverse recovery loss.

In an asynchronous mode of operation, external circuitry 330 will command a 0 or "LOW" signal at control mode electrical pin 201. PWM controller 424 will turn off low side MOSFET switch 434 all the time to minimize the switching loss and gate driving loss associated with low side MOSFET switch 434. During asynchronous mode of operation, high side power MOSFET switch 433 and Schottky diode 441 forms a regular asynchronous buck converter.

According to one embodiment of the present invention, the asynchronous buck mode operation is a constant on-time operation (e.g., $T_{ON}$ is constant). High side switch n-channel MOSFET 433 turns on for a fixed on-time ($T_{ON}$), causing the output voltage ($V_{OUT}$) to increase. At the end of each on-time ($T_{ON}$), high side n-channel MOSFET switch 433 is off and Schottky's diode 441 will pick up the inductor current ($I_L$). High-side n-channel MOSFET switch 433 remains off until output voltage ($V_{OUT}$) drops to the reference voltage ($V_{REF}$). Then high side n-channel MOSFET switch 433 is turned on for the fixed on-time ($T_{ON}$) again to initiate the next cycle. As a result of this constant on time control, the "on" pulse is evenly spaced out and the output ripple voltage is minimized.

Referring again to FIG. 4 and FIG. 5, the asynchronous mode of operation of switching regulator integrated circuit 400 terminates if one of the following conditions is met: First, when mode selector electrical pin 201 is set to 1 by external circuitry 330, switching regulator integrated circuit 400 will return to the normal synchronous buck mode as described above; second, when the effective frequency in the constant on-time ($T_{ON}$) mode increases above first frequency ($f_0$), the frequency in the synchronous buck mode, frequency comparator circuit 411 is triggered and causes PWM controller 424 to return to the normal synchronous buck mode automatically even if mode selector electrical pin (MODE) 201 is still set to 0. This prevents the excessive switching losses associated with the switching frequencies above the first frequency ($f_0$).

Figure 5:
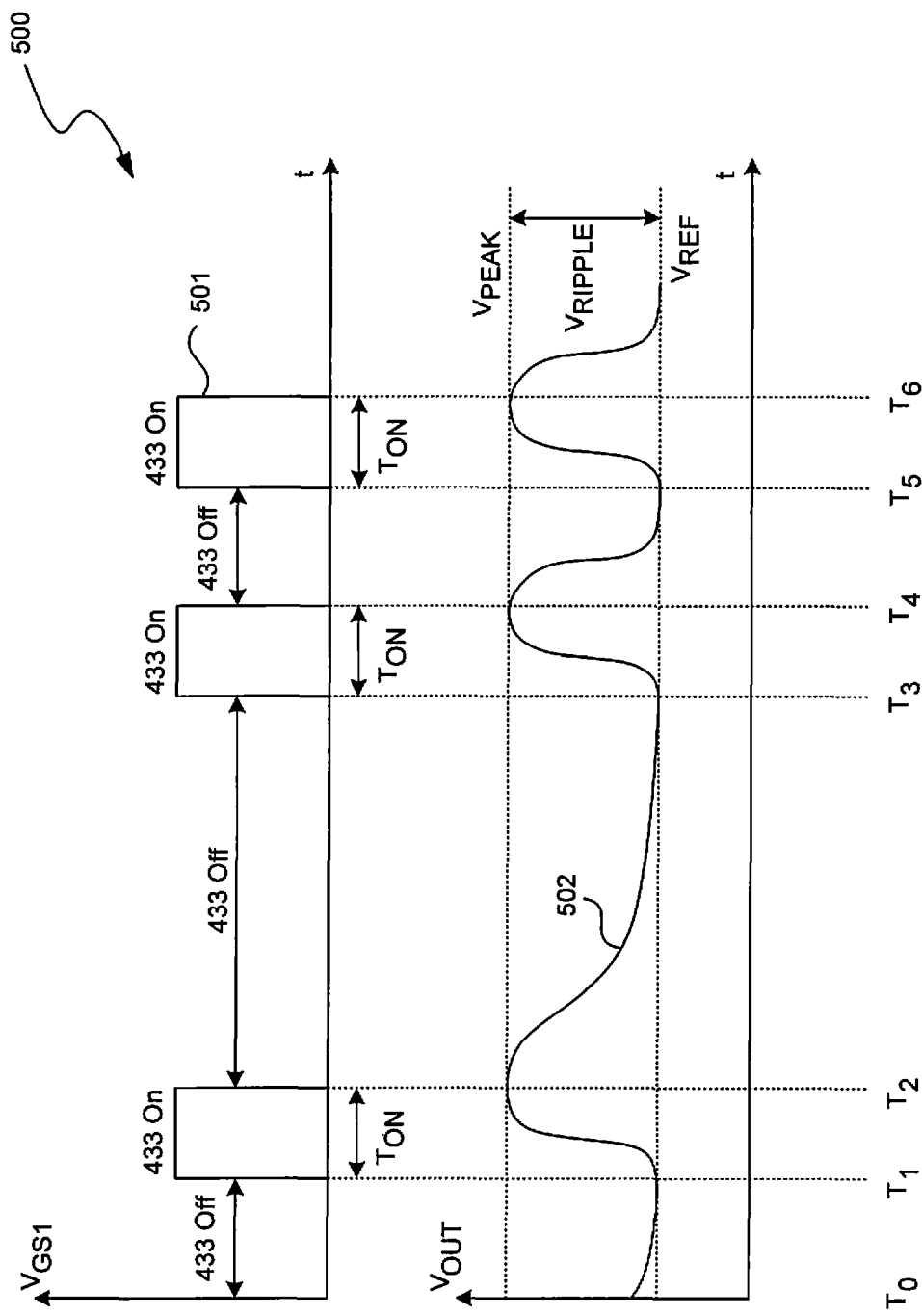
FIG. 5 illustrates output voltage waveforms and the control waveforms in the asynchronous mode of operation of the step down switch regulator integrated circuit of FIG. 4 in accordance with an embodiment of the present invention.

Referring to FIG. 5, waveform 501 represents the train of on-time ($T_{ON}$) signals at the gate of high side MOSFET switch 433. At time $T_0$, when the asynchronous buck mode of operation starts, high side n-channel MOSFET switch 433 is turned off until output voltage ($V_{OUT}$) reaches a reference voltage ($V_{REF}$) at time $T_1$. At $T_1$, high side n-channel MOSFET switch 433 is turned on for a fixed time ($T_{ON}$). And then it is turned off and remained off until the DC output voltage ($V_{OUT}$) drops to the reference voltage ($V_{REF}$) at time $T_3$. The amount of time high side n-channel MOSFET switch 433 remained OFF depends on the load current. Under the light load condition, the voltage of the output capacitor ($C_{OUT}$) 443 does not change much. Thus, the output voltage ($V_{OUT}$) decays slowly. This translates to a low variable second frequency ($f_{PWM}$). At time $T_3$, when the DC output voltage ($V_{OUT}$) drops to reference voltage ($V_{REF}$), high side n-channel MOSFET switch 433 is turned on for a fixed on time ($T_{ON}$) at time $T_3$ ($T_4$-$T_3$=$T_{ON}$). At time $T_4$, PWM controller 424 commands high side n-channel MOSFET switch to be turned off again. However, if during this time $T_4$, external circuitry 330 demands an inductor current lower than the load current, the output voltage ($V_{OUT}$) decreases faster toward the reference voltage ($V_{REF}$). Thus, from time $T_3$ on, the variable second frequency of the asynchronous mode has changed. The variable second frequency ($f_{PWM}$) changes to reflect the load condition until it reaches the first frequency ($f_0$). At that time, PWM controller 424 switches to synchronous mode of operation. The output voltage ($V_{OUT}$) in the asynchronous mode of operation is represented by waveform 502.

Figure 6:
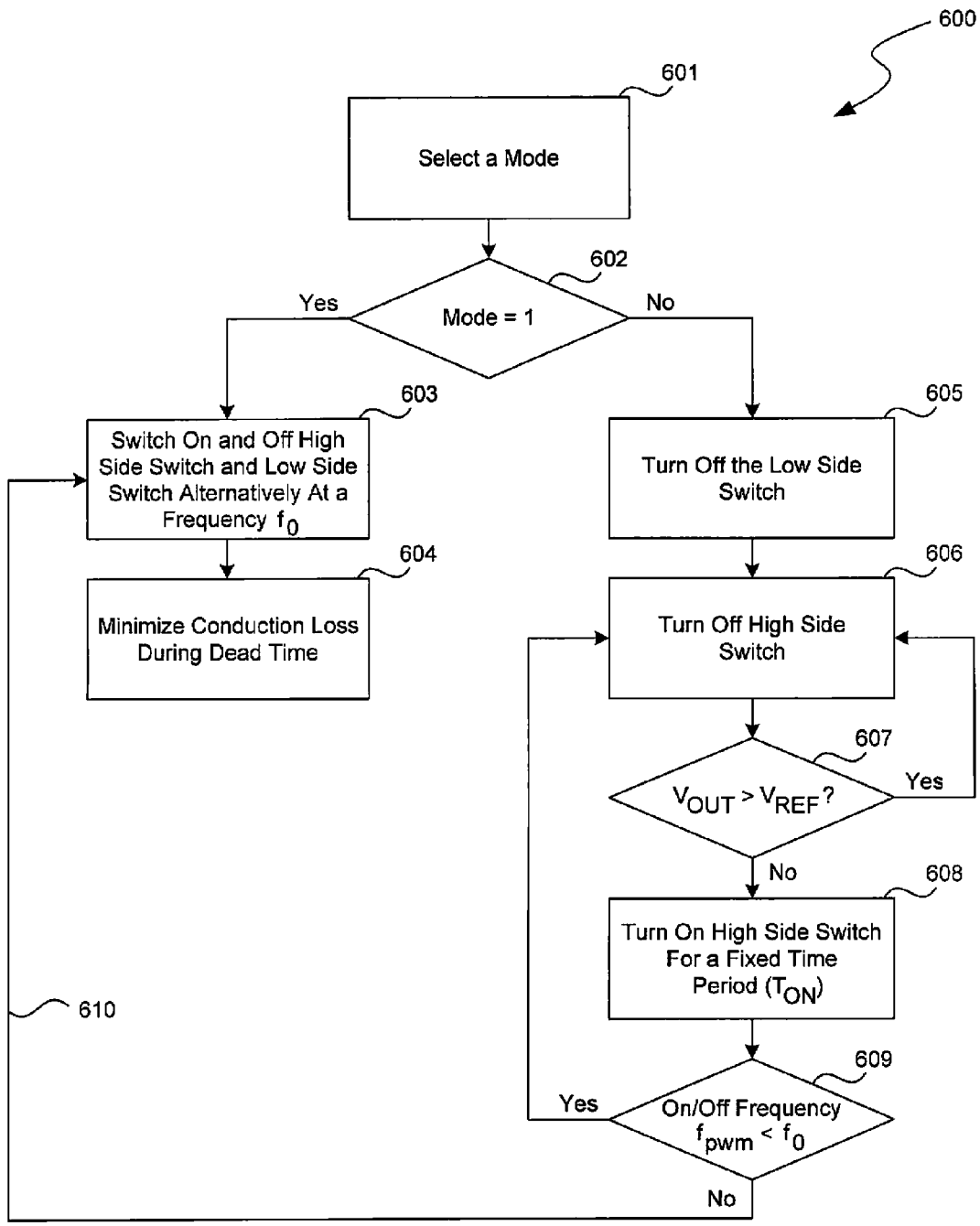
FIG. 6 illustrates a flow chart of a method of allowing a flexible way to regulate power efficiently to achieve low noise and low ripple voltages in accordance with an embodiment of the present invention.

Now referring to FIG. 6, a flow chart 600 illustrating a method of providing an efficient and low noise control for a switch-mode voltage regulator integrated circuit that includes a mode control circuit, a control circuit, and a switch circuit is illustrated. The method includes selecting either a synchronous mode or an asynchronous mode upon receiving an instruction from a user, switching on and off the switch circuit alternately at a constant first frequency so as to provide a DC output voltage when the synchronous mode is selected, and whenever the asynchronous mode is selected, switching on and off the high side switch at a variable second frequency so as to continue providing an output current that charges and maintains an output capacitor at said DC output voltage while turning off said low side power switch completely.

In one embodiment of the present invention, the selection of mode is performed by an external circuitry rather than by the switching regulator integrated circuit itself. If a synchronous mode of operation is selected (MODE=1), the high side n-channel MOSFET switch and the low side n-channel MOSFET switch are toggled on and off alternately to produce a desired voltage level. If an asynchronous mode of operation is selected (MODE=0), the low side n-channel MOSFET switch is turned off completely to improve efficiency. At the same time, the high side n-channel MOSFET switch is turned off until the output voltage drops to a reference voltage ($V_{REF}$) and then turned on at a fixed on-time ($T_{ON}$). During this constant on-time, the output voltage usually increases after the high side n-channel MOSFET switch is turned off, the Schottky diode conducts the inductor current until the current decays to zero or the high-side switch is turned on again. Consequently, the asynchronous voltage regulator operates at variable second frequency ($f_{PWM}$). The asynchronous mode of operation is terminated either when the external circuitry set control electrical pin 201 (MODE) to a HIGH or "1" level, or when the variable second frequency surpasses the first frequency ($f_o$).

More particularly, referring now to step 601, a mode is first selected. In one embodiment of the present invention, there are two modes to be selected: a synchronous mode and an asynchronous mode. The synchronous mode is selected by setting a dedicated electrical pin, namely a mode pin, to a HIGH or 1. In contrast, the asynchronous mode is selected by setting the mode selector electrical pin of the IC to an opposite logic state, a LOW or 0. The implementation of step 601 is realized by mode selector circuit 210 in FIG. 2 and FIG. 3. The mode selector circuit 210 of the present invention includes mode selector electrical pin (MODE) 201 for setting mode of operation by external circuitry 330 in FIG. 3 and FIG. 4.

Referring to step 602, determine whether a synchronous or an asynchronous mode has been selected. If mode is set to a HIGH or 1, a synchronous mode is selected. The synchronous mode represented a normal or high load operating condition in which the load demands a large output current. The asynchronous mode represented a quiet mode or light load operating condition in which the load does not demand a large output current. As described above, when mode selector electrical pin 201 is set to 1 or HIGH, switching regulator integrated circuit 400 is operating in the synchronous mode. On the other hand, when mode pin 201 is set to a LOW or 0, switching regulator integrated circuit 400 shown in FIG. 3 is operating in the asynchronous mode. The implementation of step 602 is also realized by mode selector circuit 210 as shown in FIG. 2 and FIG. 3 of the present invention.

Now referring to step 603, high side n-channel MOSFET switch and low side power n-channel MOSFET switch are switched alternately at a first frequency ($f_o$) when the synchronous mode is selected (MODE set to 1). During a normal operating condition, e.g., during high load, external circuitry selects synchronous mode to switch the high side n-channel MOSFET switch and low side n-channel MOSFET switch alternately to produce a desired output voltage level. Step 603 can be implemented using switching regulator integrated circuit (IC) 300 as shown in FIGS. 2-4 that comprise mode selector circuit 210, control circuit 220, and switch circuit 230.

Now referring to step 604, in one embodiment of the present invention, step 604 further includes a step of minimizing conduction loss during the dead time of the synchronous mode. During dead time portions of the switching cycle, both high side n-channel MOSFET switch and low side n-channel MOSFET switch are off, the output inductor produces freewheeling current that flows through the integral body diode of the low-side n-channel MOSFET switch. This current produces substantial energy loss due to a large forward voltage drop across the body diodes, thereby wasting considerable energy and reducing the switching regulator efficiency. In one embodiment of the present invention, one way to minimize conduction loss during the dead times is to connect a Schottky diode from the switch node to the electrical ground. In the present invention, Schottky diode 441 connected from switch node electrical pin (SW) 205 to electrical ground 451 is used to minimize conduction loss during dead times.

Now referring to step 605, when mode selector electrical pin is not set to 0, the asynchronous mode of operation is selected, during which time the low side MOSFET switch is turned off completely to improve efficiency of the switching regulator. Step 605 can be implemented by control circuit 220 of FIG. 2 and FIG. 4. More specifically, step 605 can be implemented by AND logic gate 414. When mode selector electrical pin is set to 0 or LOW, and the second variable frequency ($f_{PWM}$) is lower than the first frequency $f_o$, the output of AND logic gate 414 is 0 or LOW. As a result, second driver 432 is turned off, and so is low side MOSFET switch 434.

Referring to steps 606, 607, and 608, during the asynchronous mode, high side n-channel MOSFET switch is turned on and off at a variable second frequency ($f_{PWM}$). At step 606, high side n-channel MOSFET switch is turned off. At step 607, the output voltage ($V_{OUT}$) is compared to the reference voltage ($V_{REF}$) and the high side n-channel MOSFET switch is maintained off if the output voltage ($V_{OUT}$) has not dropped to the reference voltage ($V_{REF}$). At step 608, when the output voltage ($V_{OUT}$) drops to a reference voltage ($V_{REF}$), high side n-channel MOSFET switch is turned on for a fixed on time ($T_{ON}$ is constant). Then the cycle repeats for a variable second frequency ($f_{PWM}$) that is different from the first frequency ($f_o$) of the synchronous mode. This way, the ripple of the output voltage can be controlled by the pulse width of the on-time ($T_{ON}$) and the output current ($I_{OUT}$).

Steps 606, 607, and 608 can be implemented by switching regulator integrated circuit 400 shown in FIG. 3. More particularly, control circuit 220 causes first driver 431 to turn off high side n-channel MOSFET switch 433 and the DC output voltage ($V_{OUT}$) at terminal 444 is fed back to feedback pin 202 to be compared with reference voltage ($V_{REF}$). As soon as the DC output voltage ($V_{OUT}$) drops to the reference voltage ($V_{REF}$), PWM controller 424 issues a constant on-time ($T_{ON}$) pulse to turn on high side n-channel MOSFET switch 433. Then high side n-channel MOSFET switch 433 is turned off again until the DC output voltage ($V_{OUT}$) drops to the reference voltage ($V_{REF}$). The cycle repeats for a variable second frequency ($f_{PWM}$). Referring again to FIG. 4, the variable second frequency ($f_{PWM}$) increases because output current increases.

Now referring to step 609, the asynchronous mode of operation continues until the variable second frequency ($f_{PWM}$) surpasses the first frequency ($f_o$). When this condition is met, the switching regulator integrated circuit returns to the normal synchronous mode of operation. This condition represents the heavy load operation condition, whereas the asynchronous mode represents the light load operation mode. Step 609 is implemented by switching regulator integrated circuit 400. More particularly, step 609 can be implemented by frequency comparator circuit 411. Frequency comparator circuit 411 compares the first frequency ($f_o$) and variable second frequency ($f_{PWM}$). If variable second frequency ($f_{PWM}$) is equal to or greater than first frequency ($f_o$), frequency comparator circuit 411 issues a high logic signal to OR logic gate 412. As a result, the HIGH output OR logic gate 412 causes PWM controller 424 to enter the asynchronous mode.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A voltage regulator having a synchronous mode and an asynchronous mode, the voltage regulator comprising:
   an input pin;
   a switch node;
   a ground pin;
   a high-side switch to electrically connect the switch node to the input pin only if on;
   a low-side switch to electrically connect the switch node to the ground pin only if on;
   an oscillator to generate a signal having a switching frequency;
   a feedback pin having a feedback voltage; and
   a controller to generate a pulse-width-modulated signal in response to the feedback voltage and a reference voltage, the pulse-width-modulated signal having a frequency equal to the switching frequency;
   the controller, when the voltage regulator is in the synchronous mode, to switch on and off the high-side switch and the low-side switch in response to the pulse-width-modulated signal; and
   the controller, when the voltage regulator is in the asynchronous mode, to keep the low-side switch off and to switch the high-side switch on for a time interval in response to the feedback voltage and the reference voltage satisfying an ordered relationship, and provided the switching of the high-side switch has an effective frequency less than the switching frequency.

2. The voltage regulator as set forth in claim 1, further comprising:
   a diode comprising a cathode electrically connected to the switch node and an anode electrically connected to the ground pin.

3. The voltage regulator as set forth in claim 1, wherein the feedback voltage and the reference voltage satisfy the ordered relationship if and only if the feedback voltage is less than the reference voltage.

* * * * *